US006813934B2

(12) United States Patent
Kang

(10) Patent No.: US 6,813,934 B2
(45) Date of Patent: Nov. 9, 2004

(54) TOOL SET FOR DETECTING LEAKAGE OF VEHICLE ENGINES

(76) Inventor: Hsin Fa Kang, P.O. Box 90, Tainan City (TW)

( * ) Notice: Subject to any disclaimer, the term of this patent is extended or adjusted under 35 U.S.C. 154(b) by 85 days.

(21) Appl. No.: 10/391,780

(22) Filed: Mar. 20, 2003

(65) Prior Publication Data

US 2004/0182137 A1 Sep. 23, 2004

(51) Int. Cl.[7] ............................................. G01M 3/04
(52) U.S. Cl. .................................................... 73/49.7
(58) Field of Search .................... 73/40, 49.7, 118.1; 29/281.1, 281.5; 269/74

(56) References Cited

U.S. PATENT DOCUMENTS

| | | | | |
|---|---|---|---|---|
| 4,574,620 A | * | 3/1986 | Cohl | 73/47 |
| 5,195,362 A | * | 3/1993 | Eason | 73/49.7 |
| 5,372,031 A | * | 12/1994 | Harmand | 73/40 |
| 5,585,549 A | * | 12/1996 | Brevick et al. | 73/49.7 |
| 5,633,459 A | * | 5/1997 | Rodriguez | 73/120 |
| 6,105,946 A | * | 8/2000 | Sanders et al. | 269/17 |
| 6,334,375 B1 | * | 1/2002 | Belcher | 81/176.1 |
| 6,343,529 B1 | * | 2/2002 | Pool | 81/13 |
| 6,612,155 B1 | * | 9/2003 | Stergiou | 73/49.7 |
| 6,619,640 B1 | * | 9/2003 | Ploski | 269/17 |

* cited by examiner

*Primary Examiner*—Charles D. Garber

(57) ABSTRACT

A tool set for detecting leakage of vehicle engines in the invention includes a support holder having a base, a frame, an adjusting plate and a coupling member; a leakage-detecting device having at least one connecting member and a connector-tube assembly provided with a pressure gauge and a switch. In using, firstly use the support holder to hold an axle center of an engine crankshaft stationary. Secondly, screw the connecting member with a spark plug hole and connect the connector-tube assembly with a general air pump through which air is injected into an engine cylinder. Finally, when the cylinder is full of air, turn off the switch and observe an indicator needle of the gauge for reversing movements to determine whether any leakage occurs from the engine, thus providing a tool set for detecting leakage of vehicle engines that is timesaving, laborsaving and convenient in operation by a single person.

2 Claims, 6 Drawing Sheets

TOOL SET FOR DETECTING LEAKAGE OF VEHICLE ENGINES

BACKGROUND OF THE INVENTION

1. Field of the Invention

This invention relates to a tool set for detecting leakage of vehicle engines, particularly to one including a support holder capable of holding an axle center of an engine crankshaft stationary, and consisting of a base, a frame, an adjusting plate and a coupling member; a leakage-detecting device adapted to detect leakage of an engine, and having at least one connecting member and a connector-tube assembly provided with a pressure gauge and a switch. In using, firstly use the support holder to hold the axle center of the engine crankshaft stationary. Secondly, connect the leakage-detecting device respectively with a spark plug hole and a general air pump by having one end of the connecting member screwed with the spark plug hole and having one end of the connector-tube assembly connected with the general air pump through which air is injected into an engine cylinder. Finally, when the engine cylinder is full of air, turn off the switch and observe an indicator needle of the pressure gauge over a period of time for reversing movements to determine whether any leakage occurs from the engine, thus providing a tool set for detecting leakage of vehicle engines that is timesaving, laborsaving and convenient in operation by a single person.

2. Description of the Prior Art

Generally speaking, referring to FIG. 1, when an automotive engine of a vehicle is to be tested for detecting any leakage occurred therefrom in a traditional way, firstly one person is required to connect a socket 51 with a ratchet wrench 50, and then use the ratchet wrench 50 with one hand to make the socket 51 coupled over an axle center of an engine crankshaft tight so as to hold the axle center of the engine crankshaft stationary. Secondly, another person, i.e. the tester, may connect a wind hose to any one of spark plug holes of the engine, and then inject air into the engine. During testing, the tester will determine the place(s) of leakage by sounding leakage air with his experience. However, the problem with the conventional way is that at least two persons are needed to operate the test, which is time-consuming and labor-consuming. Moreover, it is difficult for the tester to achieve a best effect of detecting the place(s) of leakage only with his experience.

SUMMARY OF THE INVENTION

The main purpose of the invention is to offer a tool set for detecting leakage of vehicle engines, convenient in operation by a single person.

The main feature of the invention is to provide a tool set for detecting leakage of vehicle engines including:

a support holder capable of holding an axle center of an engine crankshaft stationary, and consisting of a base, a frame, an adjusting plate and a coupling member;

a leakage-detecting device adapted to detect leakage of an engine, and having at least one connecting member and a connector-tube assembly;

the at least one connecting member with various length, each having one end provided with a first and a second threaded portion of different diameters for being selectively connected with spark plug holes of different sizes and the other end capable of being coupled to the connector-tube assembly; and, the connector-tube assembly provided with a pressure gauge as well as a switch, and having one end capable of being coupled to the at least one connecting member, and the other end capable of being connected with a general air pump.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
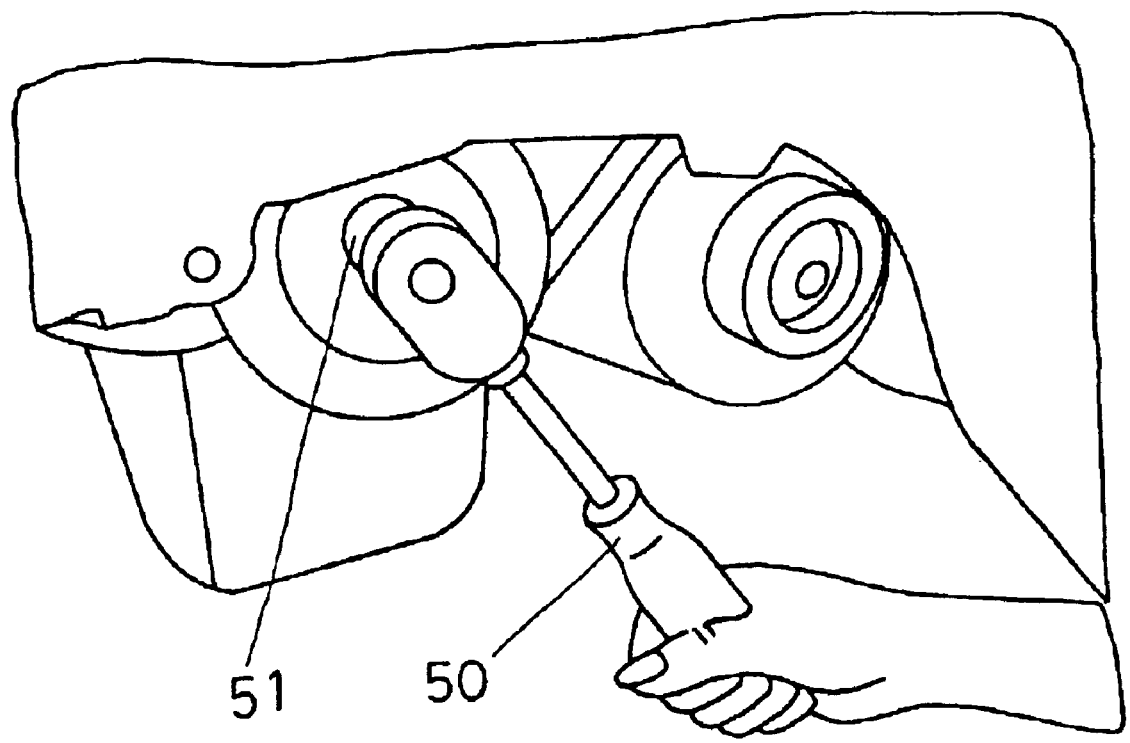
FIG. 1 is a schematic view of a conventional way of detecting leakage, showing that one person is required to use a ratchet wrench to hold an axle center of an engine crankshaft stationary.
Figure 2:
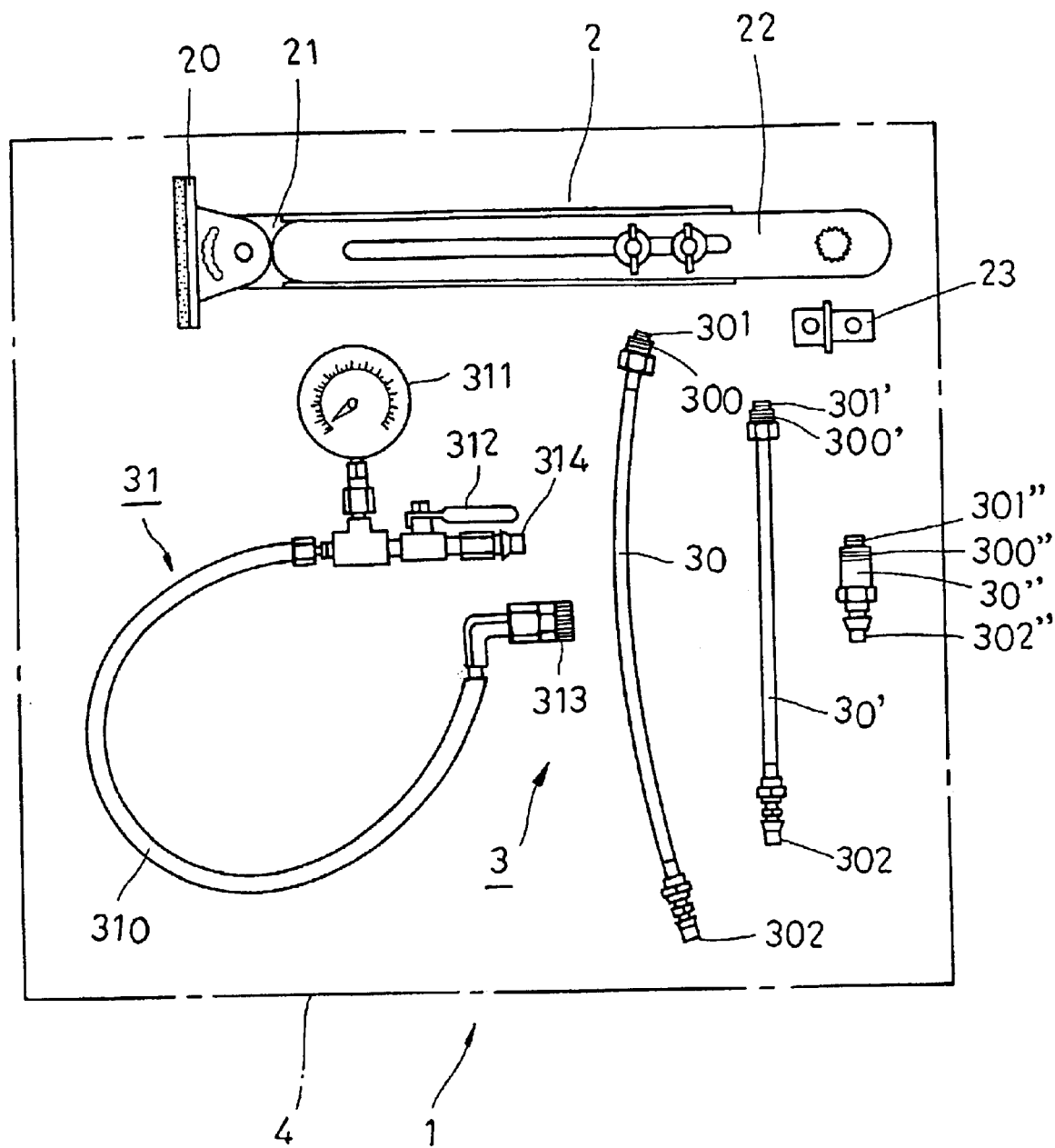
FIG. 2 is a schematic view of showing components of a tool set for detecting leakage of vehicle engines in the present invention.
Figure 3:
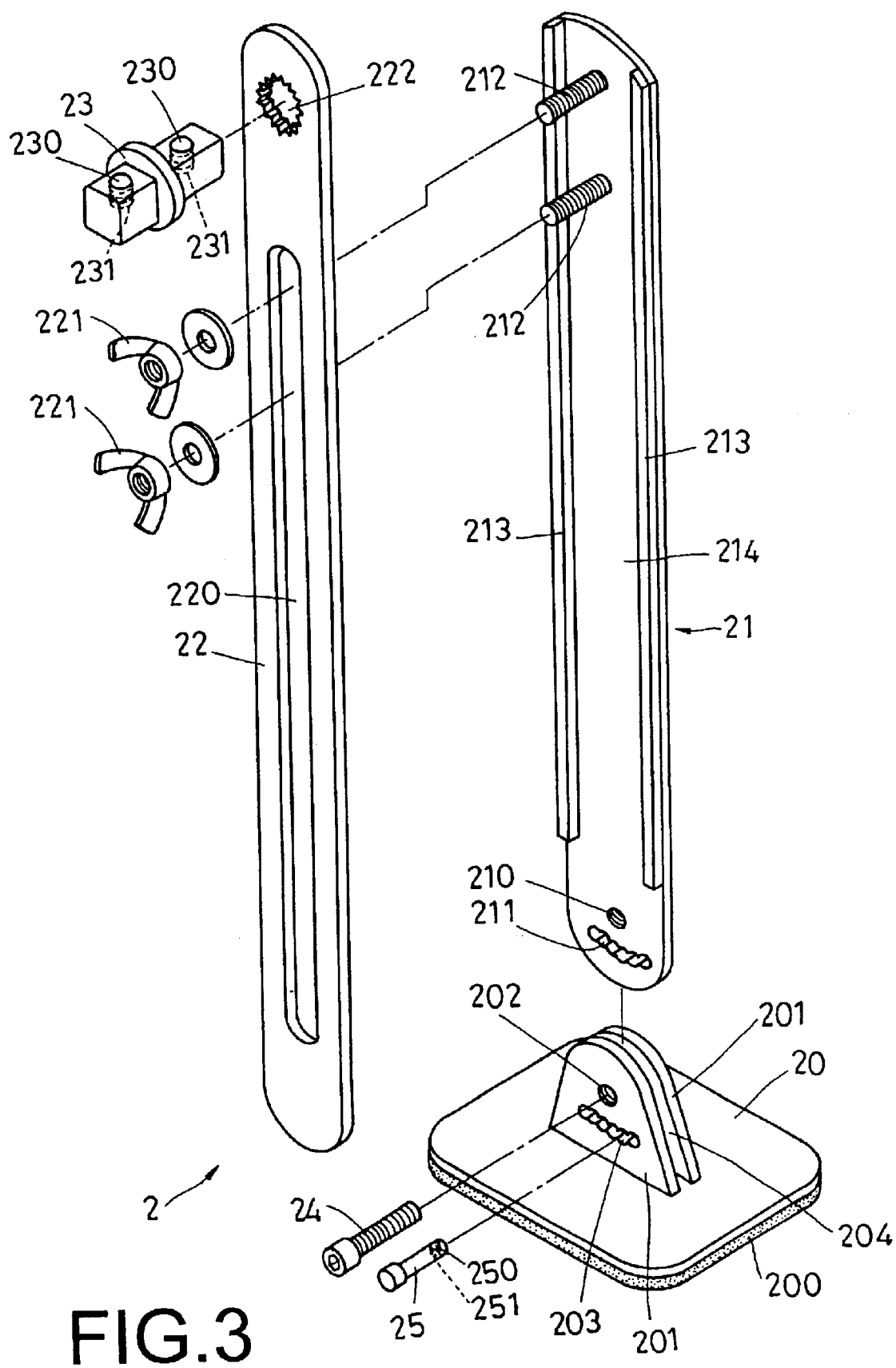
FIG. 3 is an exploded perspective view showing a first preferred embodiment of a support holder of the tool set for detecting leakage of vehicle engines in the present invention.
Figure 4:
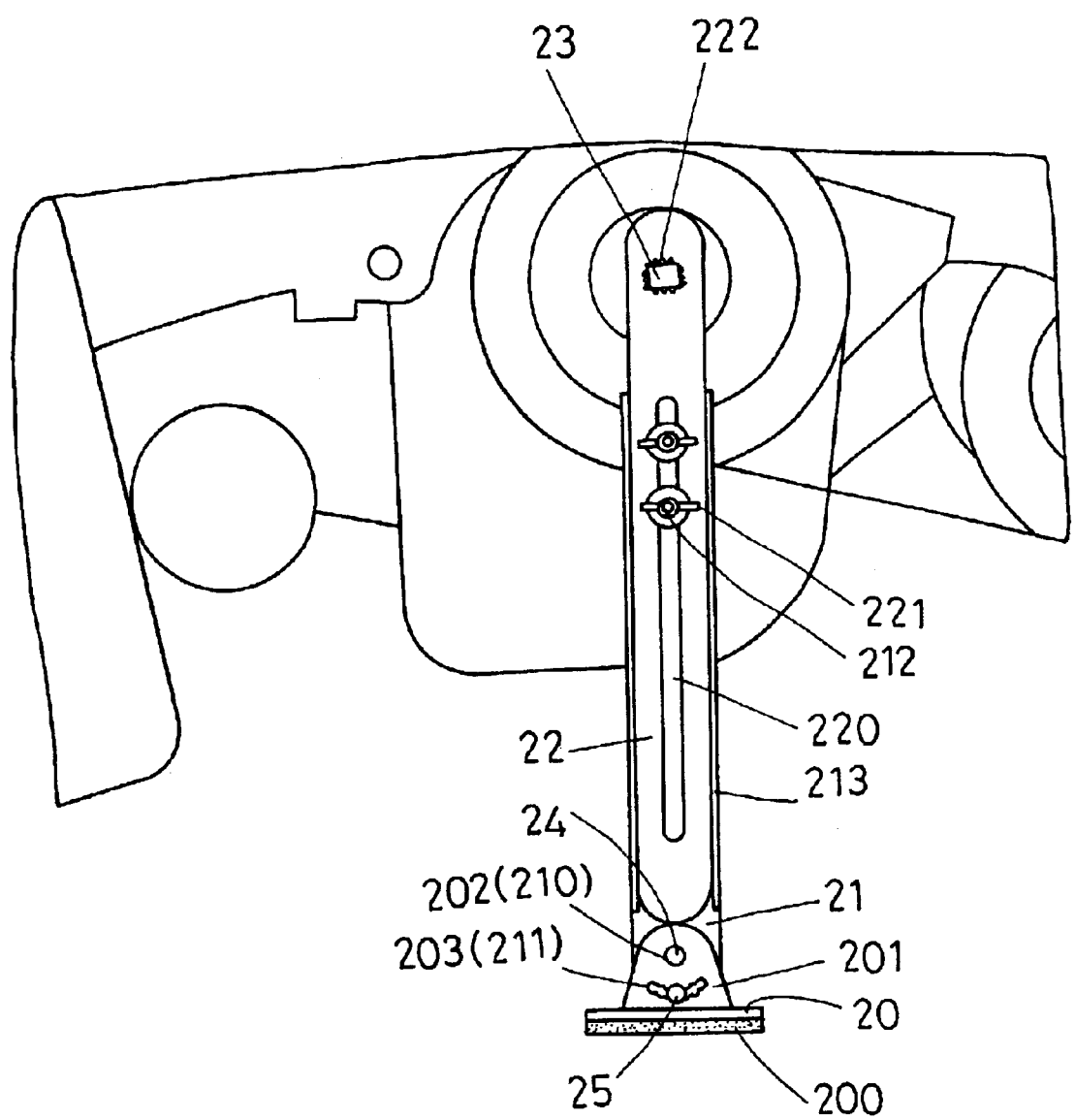
FIG. 4 is schematic view showing the support holder of the tool set for detecting leakage of vehicle engines in the present invention being in use.
Figure 5:
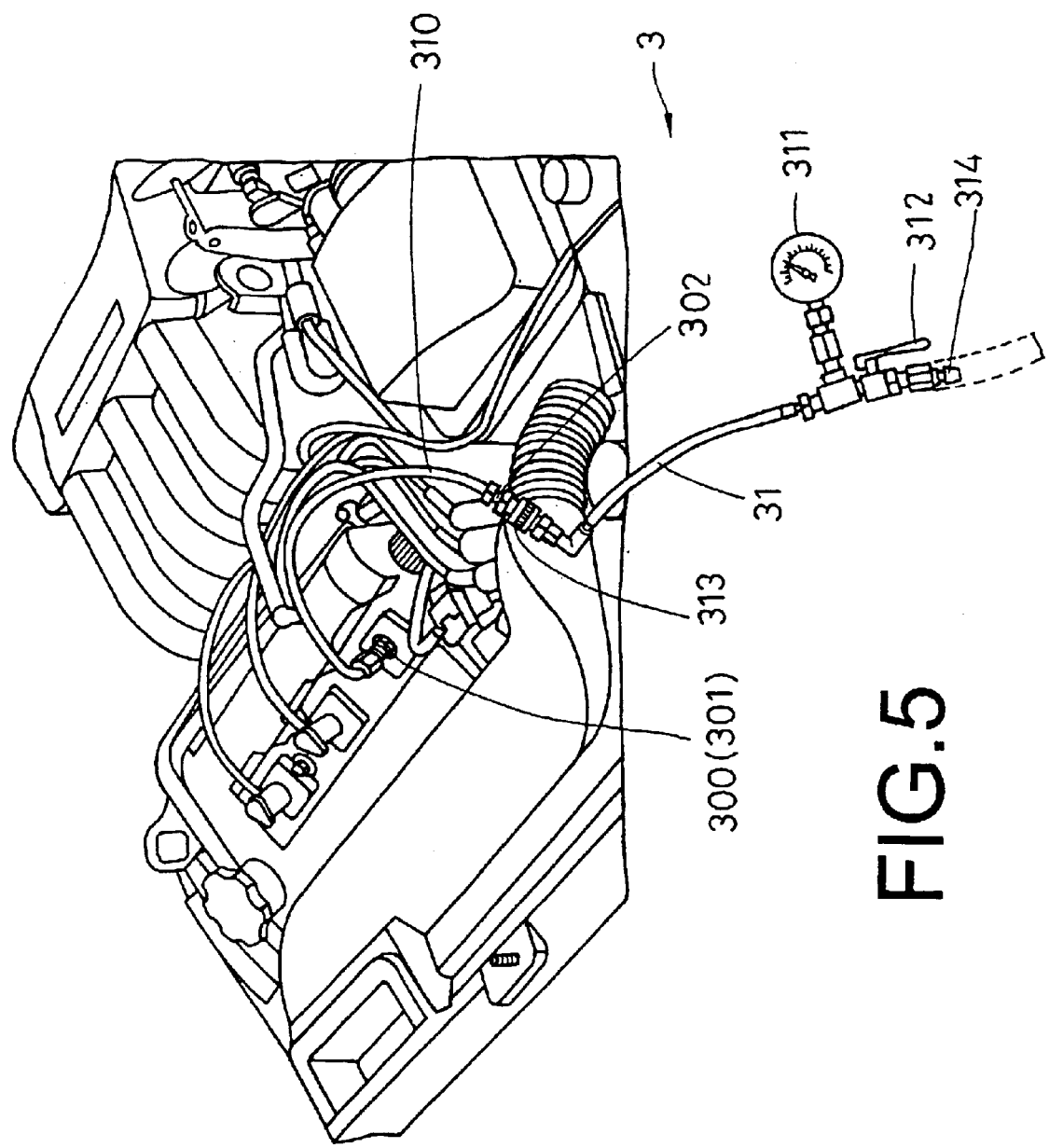
FIG. 5 is schematic view showing a leakage-detecting device of the tool set for detecting leakage of vehicle engines in the present invention being in use; and, FIG. 6 is schematic view showing a second preferred embodiment of the support holder of the tool set for detecting leakage of vehicle engines in the present invention.

A preferred embodiment of a tool set for detecting leakage of vehicle engines 1 in the present invention, as shown in FIGS. 2 and 3, has a support holder 2 and a leakage-detecting device 3 as main components.

The support holder 2 capable of holding an axle center of an engine crankshaft stationary consists of a base 20, a frame 21, an adjusting plate 22 and a coupling member 23.

The base 20 has a pad 200 attached at a bottom surface thereof and two combining plates 201 disposed at an upper surface thereof. Each of the two combining plates 201 is provided with a screw hole 202 and a plurality of engagement slots 203 disposed therein. An insertion recess 204 is formed inbetween the two combining plates 201 for being inserted by the frame 21.

The frame 21 has a screw hole 210 and a plurality of engagement slots 211 disposed at a lower portion thereof, at least one stud 212 disposed at an appropriate place thereof and two rails 213 respectively protruded at both sides thereof. The screw hole 210 and the plurality of engagement slots 211 is capable of being aligned to and combined with the screw hole 202 and the plurality of engagement slots 203 of the two combining plates 201 of the base 20 by a screw member 24 as well as a locating pin 25. A ball 250 positioned at one end of the locating pin 25 is capable of being urged upwards by a spring 251 disposed under the ball 250. A sliding way 214 is formed inbetween the two rails 213 for being accommodated with the adjusting plate 22.

The adjusting plate 22 has an elongated hole 220 disposed in a middle portion thereof for being extended through by the at least one stud 212 of the frame 21 capable of be screwed tightly by a nut member 221 to secure the adjusting plate 22 in place, and a locating hole 222 disposed at an upper portion thereof. The locating hole 222 is capable of being inserted through by the coupling member 23 and provided with points formed on an inner edge thereof.

The coupling member 23 is provided with at least one resilient projection 230 disposed thereon, and has one end capable of being inserted through the locating hole 222 of the adjusting plate 22 and the other end capable of being fitted into a general socket. Each of the resilient projection 230 is capable of being urged upwards by a spring 231 disposed under the resilient projection 230.

The leakage-detecting device 3 adapted to detect leakage of an engine, and having at least one connecting member 30, 30', 30" with various length and a connector-tube assembly 31.

The connecting member 30 or 30' or 30" has one end provided with a first threaded portion 300 or 300' or 300" and a second threaded portion 301 or 301' or 301" being concentric with each other, but different in diameter for being selectively connected with spark plug holes of different sizes, and the other end designed to be a coupling end 302 or 302' or 302" and capable of being coupled to the connector-tube assembly 31.

The connector-tube assembly 31 has a connecting tube 310 provided with a pressure gauge 311 and a switch 312 disposed at an appropriate place thereof. The connecting tube 310 has one end provided with a quick coupler 313 for being quickly coupled to the coupling end 302 or 302' or 302" of the connecting member 30 or 30' or 30", and the other end provided with a joint head 314 for being connected with a general air pump.

In assembling the support holder 2, referring to FIGS. 2 to 3, firstly insert the lower end of the frame 21 into the insertion recess 204 formed inbetween the two combining plates 201 of the base 20 with the screw hole 210 of the frame 21 aligned to and combined with the screw holes 202 of the two combining plates 201 of the base 20 by the screw member 24 and with the plurality of engagement slots 211 of the frame 21 aligned to and combined with the plurality of engagement slots 203 of the two combining plates 201 of the base 20 by the locating pin 25 so as to combine the frame 21 and the two combining plates 201 of the base 20 together. Secondly, attach the adjusting plate 22 to the frame 21 with the locating hole 222 of the adjusting plate 22 placed in an upper position to make the studs 212 of the frame 21 extended through the elongated slot 220 of the adjusting plate 22 so that the adjusting plate 22 can be accommodated within the sliding way 214 of the frame 21 and is allowed to move upwards or downwards only along the sliding way 214 in a vertical-linear direction under the limitation of the two rails 213. Finally, after the adjusting plate 22 is moved to a required position, screw the nut members 221 with the studs 212 of the frame 21 tightly so as to fix the adjusting plate 22 in the required position.

In using the tool set for detecting leakage of vehicle engines 1 in the present invention, referring to FIGS. 2 to 5, firstly place the support holder 2 on the ground with the pad 200 of the base 20 attached on the surface of the ground so that the support holder 2 can stand on the ground stably. Secondly, adjust the height of the adjusting plate 22 to make the locating hole 222 aligned to the axle center of the engine crankshaft, and then screw the nuts 221 with the studs 212 of the frame 21 tightly. Thirdly, insert one end of the coupling member 23 through the locating hole 222 of the adjusting plate 22, fit the other end of the coupling member 23 into a general socket, and then couple the general socket over an axle center of an engine crankshaft tight so as to hold the axle center of the engine crankshaft stationary to prevent the crankshaft from rotation. Fourthly, use the leakage-detecting device 3 to detect leakage of an engine by selecting a suitable connecting member 30 or 30' or 30" to make the coupling end 302 or 302' or 302" of the connecting member 30 or 30' or 30" coupled to the quick coupler 313 of the connector-tube assembly 31 and make the threaded end of the connecting member 30 or 30' or 30" connected with a spark plug hole, and then connect the joint head 314 of the connector-tube assembly 31 with a general air pump. Finally, inject air from the general air pump into an engine cylinder, and turn off the switch 312 when the engine cylinder is full of air indicated by the pressure gauge 311 of the connector-tube assembly 31, and then observe an indicator needle of the pressure gauge 311 over a period of time for any reversing movements to determine whether any leakage occurs from the engine, thus providing the tool set for detecting leakage of vehicle engines 1 in the present invention that is timesaving, laborsaving and convenient in operation by a single person.

Figure 6:
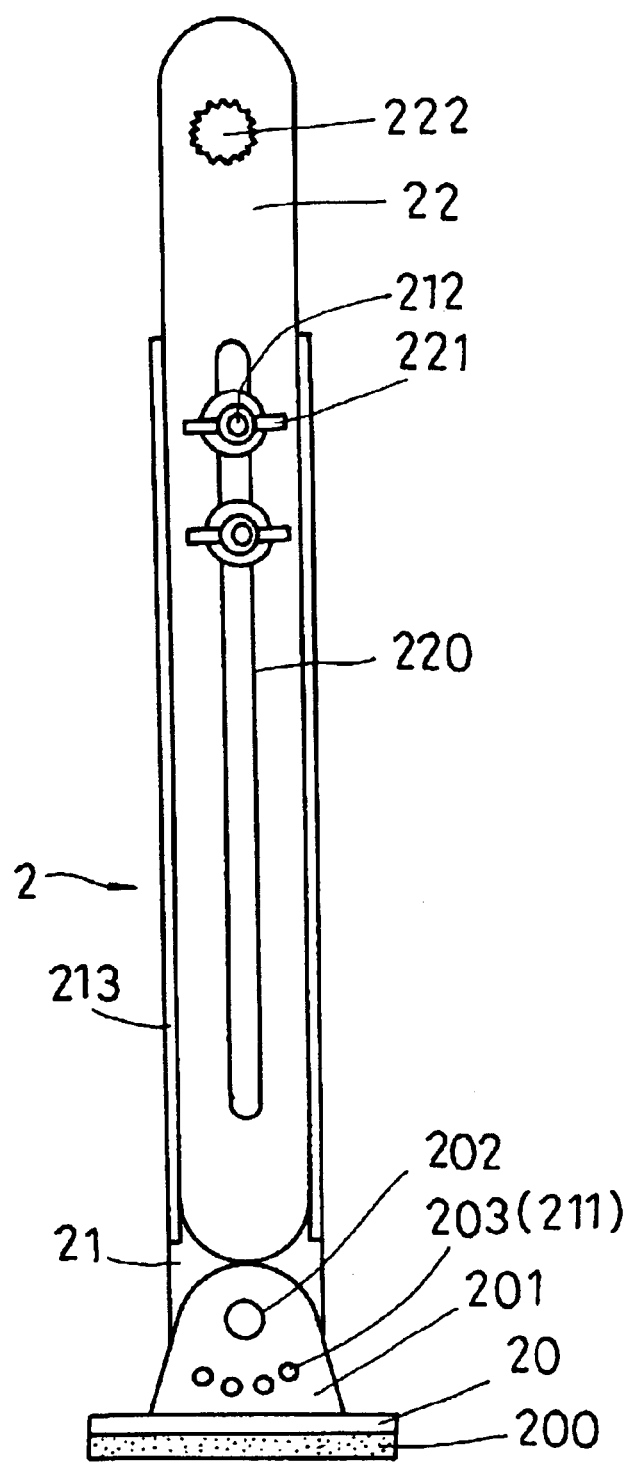

Another preferred embodiment of the support holder 2, as shown in FIG. 6, is that the plurality of engagement slots 203, 211 of the two combining plates 201 of the base 20 and the frame 21 are capable of being replaced with a plurality of circular holes arranged in a curved way and also allowed to be inserted through by the locating pin 25 for combining the frame 21 and the two combining plates 201 together.

The tool set for detecting leakage of vehicle engines 1 in the present invention is capable of being deposited in a packing container 4 for convenience of storage.

The invention has the following advantages and effects, as can be understood from the aforesaid description.

1. The pad 200 attached at the bottom surface of the base 20 of the support holder 2 is designed to facilitate the support holder 2 to stand on the ground stably.

2. In case that an axle center of an engine crankshaft is not positioned perpendicular to an uneven ground, the engagement slots 203, 211 of the two combining plates 201 of the base 20 and of the frame 21 are designed to facilitate the support holder 2 to stand on the ground stably and to actually hold the axle center of the engine crankshaft stationary without rotation by adjusting the frame 21 to a proper angle, and then inserting the locating pin 25 through the engagement slots 203, 211 to combine the two combining plates 201 of the base 20 and the frame 21 together so as to fix the frame 21 at the proper angle firmly.

3. The adjusting plate 22 of the support holder 2 is capable of being adjusted to any required height suitable in operation.

4. The points formed on the inner edge of the locating hole 222 of the adjusting plate 22 are designed to be inserted through by the coupling member 23 at any angle and fix the coupling member 23 steadily.

5. The first threaded portion 300 or 300' or 300" and the second threaded portion 301 or 301' or 301" of the connecting member 30 or 30'or 30" designed to be concentric with each other, but different in diameter are convenient for being selectively connected with spark plug holes of different sizes.

6. The pressure gauge 311 and the switch 312 are capable of being disposed at one end of the connector-tube assembly 31, convenient for a user to control the switch 312 for injecting or stopping air, and to observe an indicator needle of the pressure gauge 311 for any reversing movements to determine whether any leakage occurs from an engine.

7. The tool set for detecting leakage of vehicle engines 1 in the present invention is convenient in operation by a single person, excellent in detecting any leakage from an engine, easy to be assembled, simple in operation, efficient with high working capacity, timesaving and laborsaving.

While the preferred embodiments of the invention have been described above, it will be recognized and understood that various modifications may be made therein and the appended claims are intended to cover all such modifications that may fall within the spirit and scope of the invention.

What is claimed is:

1. A tool set for detecting leakage of vehicle engines comprising:

a support holder capable of holding an axle center of an engine crankshaft stationary, and consisting of a base, a frame, an adjusting plate and a coupling member;

a leakage-detecting device adapted to detect leakage of an engine, and having at least one connecting member and a connector-tube assembly;

each said at least one connecting member having one end provided with a first and a second threaded portion of different diameters for being selectively connected with spark plug holes of different sizes and the other end capable of being coupled to said connector-tube assembly;

said connector-tube assembly provided with a pressure gauge as well as a switch, and having one end capable of being coupled to said at least one connecting member, and the other end capable of being connected with a general air pump; and, whereby in using, firstly use said support holder to hold said axle center of said engine crankshaft stationary, secondly connect said leakage-detecting device respectively with any one of said spark plug holes and said general air pump by having said first and said second threaded portions of said one end of said at least one connecting member connected with said spark plug hole and having said the other end of said connector-tube assembly connected with said general air pump through which air is capable of being injected into an engine cylinder, thirdly when said pressure gauge indicates that sufficient air is injected into said engine cylinder, turn off said switch and observe an indicator needle of said pressure gauge over a period of time for any reversing movements to determine whether any leakage occurs from said engine, thus providing a tool set for detecting leakage of vehicle engines that is timesaving, laborsaving and convenient in operation by a single person;

said base of said support holder has two combining plates disposed at an upper surface thereof, each of said two combining plates provided with a screw hole, an insertion recess formed inbetween said two combining plates for being inserted by said frame of said support holder;

wherein said frame of said support holder has a screw hole disposed at a lower portion thereof, at least one stud disposed at an appropriate place thereof and two rails respectively protruded at both sides thereof, said screw hole capable of being aligned to and combined with said screw hole of said two combining plates of said base by a screw member, a sliding way formed inbetween said two rails for being accommodated with said adjusting plate of said support holder;

wherein said adjusting plate of said support holder has an elongated hole disposed in a middle portion thereof for being extended through by said at least one stud of said frame capable of be screwed tightly by a nut member to secure said adjusting plate in place, and a locating hole disposed at an upper portion thereof, said locating hole capable of being inserted through by said coupling member of said support holder and provided with points formed on an inner edge thereof; and, wherein said coupling member of said support holder is provided with at least one resilient projection disposed thereon, and has one end capable of being inserted through said locating hole of said adjusting plate and the other end capable of being fitted into a general socket.

2. The tool set for detecting leakage of vehicle engines as claimed in claim 1, wherein each of said two combining plates provided with a plurality of engagement slots, and said frame of said support holder has a plurality of engagement slots disposed at a lower portion thereof, at least one stud disposed at an appropriate place thereof and two rails respectively protruded at both sides thereof, said plurality of engagement slots of said frame capable of being aligned to and combined with said plurality of engagement slots of said two combining plates of said base by a locating pin.

* * * * *